US009525604B2

(12) United States Patent
Gingade et al.

(10) Patent No.: US 9,525,604 B2
(45) Date of Patent: Dec. 20, 2016

(54) AUTOMATED SYNCHRONIZATION OF DISTRIBUTED DASHBOARDS

(71) Applicant: International Business Machines Corporation, Armonk, NY (US)

(72) Inventors: Sunil Kumar S. Gingade, Basavapattana (IN); Gaurav Gupta, Kanpur (IN); Yochana S. Honnavar, Bangalore (IN); Albee Jhoney, Bangalore (IN); Vijay R. Kalangumvathakkal, Pathanamthitta (IN); Anil N. Kumar, Bangalore (IN); Ashish K. Thakur, Asansol (IN)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 14/217,626

(22) Filed: Mar. 18, 2014

(65) Prior Publication Data
US 2015/0271032 A1    Sep. 24, 2015

(51) Int. Cl.
*G06F 3/048* (2013.01)
*H04L 12/26* (2006.01)
*G06F 3/0484* (2013.01)

(52) U.S. Cl.
CPC ......... *H04L 43/045* (2013.01); *G06F 3/04847* (2013.01)

(58) Field of Classification Search
CPC .... G06F 3/048; G06F 3/0481; G06F 17/3089; G06F 17/30873; H04L 12/2602; H04L 43/045; H04L 29/0809; H04L 67/10; H04L 41/145; H04L 41/5054; H04L 41/50; H04L 43/08
See application file for complete search history.

(56) References Cited

U.S. PATENT DOCUMENTS

| 5,345,551 | A  | 9/1994  | Shelley et al. |
| 6,175,877 | B1 | 1/2001  | Zerber |
| 6,308,212 | B1 | 10/2001 | Besaw et al. |
| 6,401,138 | B1 | 6/2002  | Judge et al. |
| 7,039,656 | B1 | 5/2006  | Tsai et al. |
| 7,222,111 | B1 | 5/2007  | Budike, Jr. |
| 8,407,576 | B1 | 3/2013  | Yin et al. |

(Continued)

OTHER PUBLICATIONS

Hagan, "Dashboards: Synchronization and Drill down", Two Rivers Flowing, Feb. 18, 2012, <http://tworivers.com/blog/archives/738>.

*Primary Examiner* — Tadeese Hailu
(74) *Attorney, Agent, or Firm* — Olivia R. Scheuer

(57) ABSTRACT

According to embodiments of the present invention, one or more computer processors publish a resource detail displayed and an associated first usage context, wherein the resource detail is displayed by a dashboard associated with a leader application. The one or more computer processors determine an appropriate graphical representation for a follower application, to display a first resource having a relationship to a second resource, wherein the second resource is displayed in the dashboard associated with the leader application. The one or more computer processors generate a dashboard universal resource locator for the follower application utilizing the resource detail. The one or more computer processors instruct the follower application to update an associated dashboard with information included in the generated dashboard universal resource locator.

15 Claims, 5 Drawing Sheets

(56) References Cited

U.S. PATENT DOCUMENTS

| | | |
|---|---|---|
| 8,464,262 B2 | 6/2013 | Ly et al. |
| 2003/0126301 A1 | 7/2003 | Mason et al. |
| 2007/0130541 A1* | 6/2007 | Louch ................. G06F 3/04817 |
| | | 715/804 |
| 2007/0198944 A1 | 8/2007 | Viswanathan et al. |
| 2008/0222565 A1 | 9/2008 | Taylor et al. |
| 2010/0325211 A1 | 12/2010 | Ylinen et al. |
| 2011/0126111 A1* | 5/2011 | Gill ......................... G06F 21/55 |
| | | 715/736 |
| 2013/0013677 A1* | 1/2013 | Engstrom ........... H04L 67/2823 |
| | | 709/203 |
| 2013/0173291 A1 | 7/2013 | Kelly et al. |
| 2013/0174063 A1 | 7/2013 | Chmiel et al. |
| 2013/0246130 A1* | 9/2013 | Michel ................. G06Q 10/067 |
| | | 705/7.36 |
| 2013/0254711 A1* | 9/2013 | Sievert ................ G06F 11/3072 |
| | | 715/810 |
| 2013/0298000 A1* | 11/2013 | Zuccarino ........... G06F 17/2235 |
| | | 715/205 |
| 2015/0058092 A1* | 2/2015 | Rea .................... G06Q 10/0639 |
| | | 705/7.38 |
| 2015/0212700 A1* | 7/2015 | Mithal ................ G06F 3/04842 |
| | | 715/765 |

* cited by examiner

AUTOMATED SYNCHRONIZATION OF DISTRIBUTED DASHBOARDS

BACKGROUND

The present disclosure relates generally to the field of management information systems, and more particularly to synchronizing the content of distributed dashboards. Dashboards are easy to read, often unpaginated, real-time user interfaces that display graphical presentations of the current status and historical trends of an organization's key performance indicators ("KPIs") to facilitate rapid informed decision making. A typical IT command center can have multiple dashboards that display the current operational status of their critical business resources from different perspectives. These perspectives are often defined by the domain specialist from different IT service management domains (e.g. network management, storage management, server management, application management, database management, security management, etc.).

Typically, dashboards ("display devices") for the various IT Service Management applications are designed using different tools and technologies to display different sets of information pertaining to a common set of resources in a data center. In the command center, dashboards are configured to cycle through and display the current operational status of a large set of business critical resources, such as related KPIs, service level agreements, and service level objectives, one or more at a time, at a certain periodicity. The periodicity and the content displayed by the different dashboards are not in sync. Currently, users, such as operations manager or system administrator, in the command center have to remember what they saw displayed in the different dashboards and mentally correlate the status displayed by these dashboards. For example, a database and application status in the application management dashboard is correlated by a user with the status of related network elements in the network management dashboard.

SUMMARY

According to embodiments of the present invention, one or more computer processors publish a resource detail displayed and an associated first usage context, wherein the resource detail is displayed by a dashboard associated with a leader application. The one or more computer processors determine an appropriate graphical representation for a follower application, to display a first resource having a relationship to a second resource, wherein the second resource is displayed in the dashboard associated with the leader application. The one or more computer processors generate a dashboard universal resource locator for the follower application utilizing the resource detail. The one or more computer processors instruct the follower application to update an associated dashboard with information included in the generated dashboard universal resource locator.

DETAILED DESCRIPTION

Figure 1:
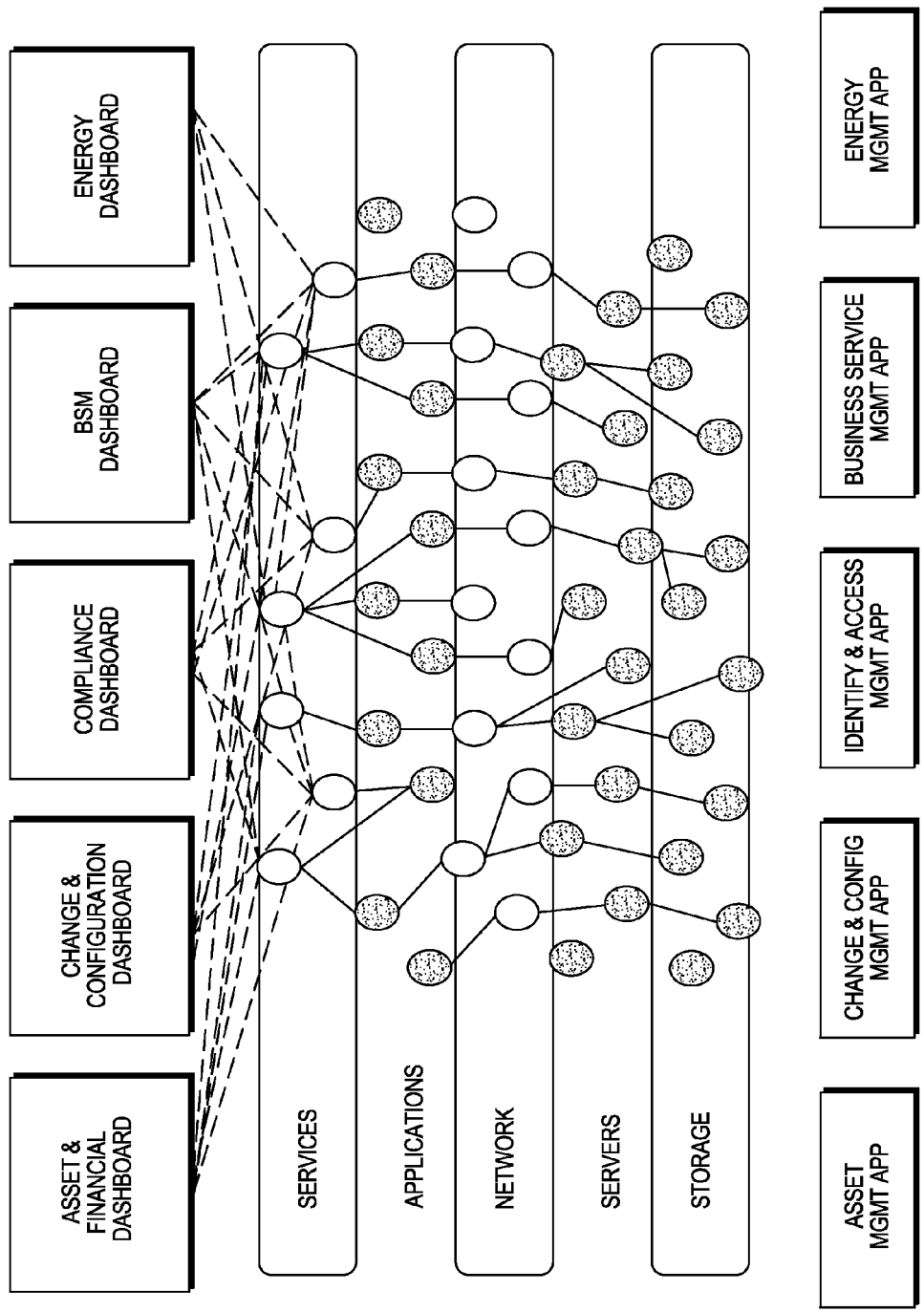
FIG. 1 is an exemplary depiction of resources and their relationships to IT service management applications.

With reference now to FIG. 1-4. The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read only memory (ROM), an erasable programmable read only memory (EPROM or Flash memory), a static random access memory (SRAM), a portable compact disc read only memory (CD-ROM), a digital versatile disk (DVD), a memory stick, a floppy disk, a mechanically encoded device such as punch cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus ("systems"), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Dashboards are easy to read, often unpaginated, real-time user interface, displaying a graphical presentation of the current status and historical trends of an organization's key performance indicators ("KPIs") to decrease the time required to make informed decisions at a glance. For example, an IT server management dashboard may reflect key performance indicators related to operating systems, processors, and memory. A typical IT command center can display multiple dashboards ("display devices") that reflect the current operational status of their associated critical business resources from different perspectives. These perspectives are often defined by the domain specialist from different IT Service Management ("ITSM") domains (e.g. network management, storage management, server management, application management, database management, security management, etc.).

Typically dashboards ("display devices") for the various ITSM applications ("ITSM Apps") are designed using different tools and technologies to display different sets of information pertaining to a common set of resources in a data center. In the command center, dashboards are configured to cycle through and display the current operational status of a plurality of business critical resources, such as related KPIs, service level agreements, and service level objectives, one or more at a time, at a certain periodicity. However, the update/refresh periodicity and the content displayed by the different dashboards may not be in sync. Certain embodiments of the present invention seek to synchronize the content displayed in the dashboards of different IT management applications displayed on different devices.

Embodiments of the present invention will now be described in detail with reference to the Figures. FIG. 1 is an exemplary depiction of resources managed by ITSM Apps and their relationships to each other, in accordance to an embodiment of the present invention. ITSM Apps are used to manage a finite collection of resources, such as services, applications, network assets, servers, storage elements, that are used to deliver services, such as business services, that are related to each other in a variety a different ways. ITSM Apps use dashboards to display resources attributes and highlights the business value delivered. The dashboards are displayed in a Web browser (e.g. client-side application container) or embedded in a portlet in portal (e.g. server-side container). Views and resources that are displayed in the dashboard are user selectable. Although certain ITSM Apps are depicted in FIG. 1, any ITSM App is applicable herein.

In embodiments of the present invention, a usage context for the ITSM App dashboards defines the views used to display certain characteristics of a resource or a list of resources and certain attributes of the resource. For example, a "health dashboard", "performance dashboard", or "energy dashboard" displays the "health", "performance", or "energy" characteristics of the resources managed by the particular ITSM App. Such dashboards may be displayed using a variety computing devices (e.g. two or more—LCD monitors, hand-held devices, laptops, etc.).

ITSM App dashboards are designed to be rendered either in a client-side container, such as a web browser, or in a server-side container, such as a portlet in a portal. Such dashboards use a variety of views with which to display resources and related information. Dashboard containers can receive and respond to events originating from user interface components (such as—views, portlets, and widgets) used in the dashboard. Similarly, dashboard containers can receive and respond to external events, thereby controlling the nature of the information that is displayed therein.

For example, a Web browser plug-in can receive an external event and in response open a dashboard Web page, for example using an universal resource locator (URL), to view the details of a resource using an appropriate view. Independent ITSM Apps can display lists and/or details of resources, which are related to each other. In certain embodiments, resource relationships are stored in a central registry that can be queried externally. In other embodiments, dashboards of independent ITSM Apps are kept in sync from, for example, a time-perspective, resource/resource-relationship perspective, and/or usage context perspective.

Figure 2:
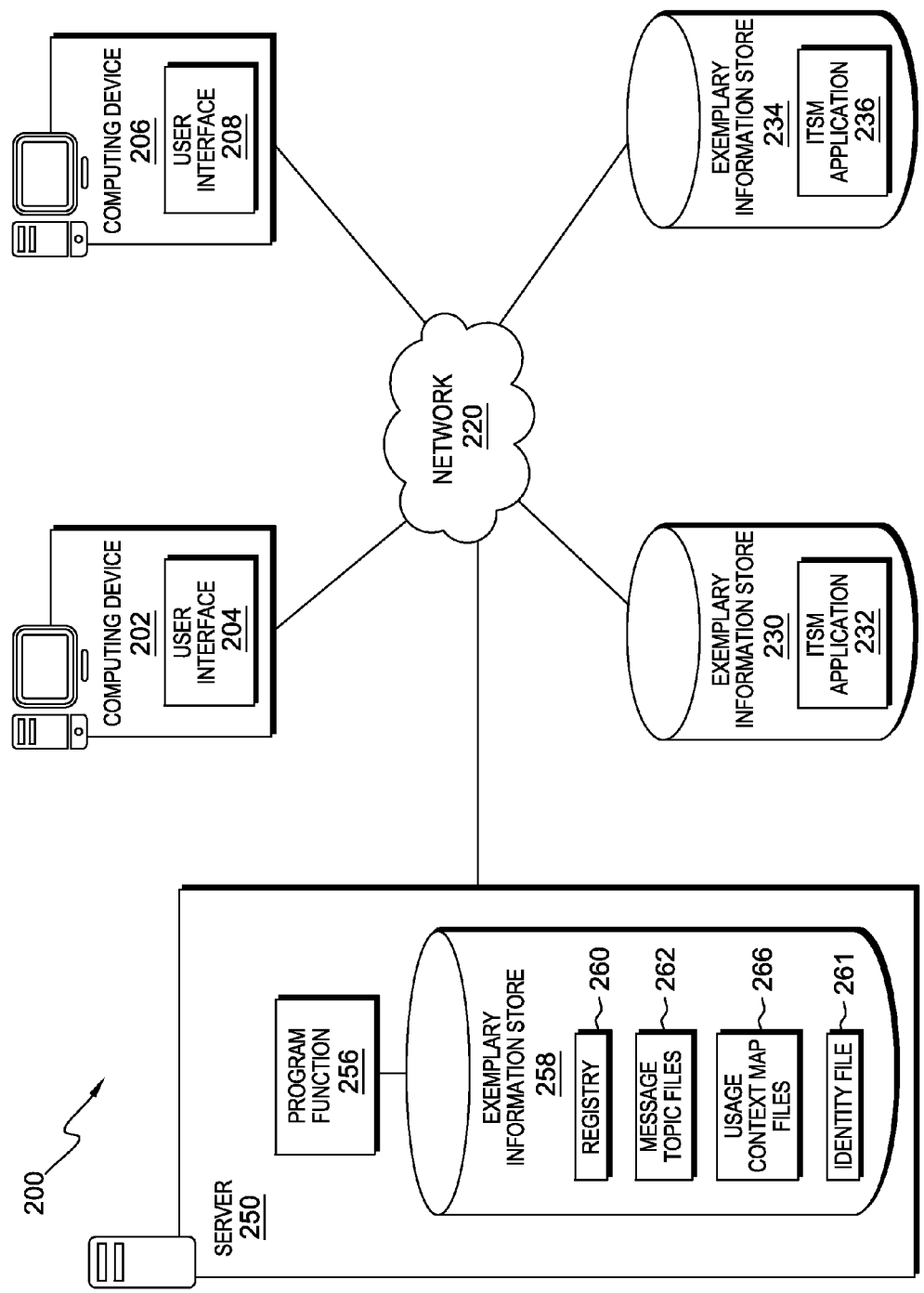
FIG. 2 is a block diagram illustrating an environment, in accordance with an embodiment of the present invention.

Only one ITSM App may act as a "leader", whose usage context is shared and published, and the other ITSM Apps act as "followers", in accordance with an embodiment of the present invention. "Followers" are notified about usage context changes that are associated with the "leader" and appropriate and related resources from a resource registry. The appropriate usage context for "follower" ITSM Apps are identified. FIG. 2 is a block diagram illustrating an environment, generally designated 200, in accordance with an embodiment of the present invention.

Environment 200 is an ITSM environment that allows for the planning and scheduling of work across business and IT environments. Environment 200 includes exemplary information stores 230 and 234; computing devices 202 and 206; and server 250, all interconnected over network 220. Network 220 can be, for example, a local area network (LAN), a wide area network (WAN) such as the Internet, or a combination of the two, and can include wired, wireless, or fiber optic connections. In general, network 220 can be any combination of connections and protocols that will support communications between exemplary information stores 230 and 234; computing devices 202 and 206; and server 250.

In various embodiments of the present invention, server 250 and computing devices 202 and 206 may be a laptop computer, a tablet computer, a netbook computer, a personal computer (PC), a desktop computer, a personal digital assistant (PDA), a smart phone, or any programmable electronic device capable of communicating via network 220. Exemplary information stores 230 and 234 are information repositories that include ITSM Apps 232 and 236, respectively. Applicable ITSM Apps (discussed above) include, but are not limited to, asset management, configuration management, change management, service catalog and request management, incident management, procurement management, release management, and license management. In general, ITSM Apps (discussed above) are focused on the "back office" or operational concerns of IT management software that is utilized to implement and manage IT services.

Computing devices 202 and 206 act as dashboard containers and are utilized to visualize and access dashboards generated by ITSM Apps 232 and 236, respectively, in accordance with an embodiment of the present invention. Computing devices 202 and 206 include user interfaces 204 and 208, which allow a user to access and manipulate ITSM Apps 232 and 236, respectively. User interfaces 204 and 208 can be textually and/or graphically based. In an embodiment, user interfaces 204 and 208 display dashboards generated by ITSM Apps 232 and 236, respectively. Computing devices 202 and 206 can receive and respond to events originating from the components, such as views, portlets, and widgets, in the respective dashboards displayed by user interfaces 204 and 208. Similarly, the computing devices 202 and 206 can allow a user to receive and respond to external events from the ITSM Apps on network 220, such as ITSM Apps 232 and 236. Computing devices 202 and 206 can allow a user to control the nature of information displayed in user interfaces 204 and 208, respectively. In certain embodiments, a single user interface, such as user interface 204, is utilized to display multiple dashboards, such as those generated by ITSM Apps 232 and/or 236.

Server 250 is a computing device utilized to facilitate IT service management, in accordance with an embodiment of the present invention. Server 250 includes exemplary information store 258 and program function 256.

Exemplary information store 258 is in communication with program function 256. Exemplary information store 258 is an information repository that includes registry 260, message topic files 262, usage context map files 266, and identity file 261. Although exemplary information store 258 is depicted as being included in server 250, exemplary information store 258 may be a component that is external to server 250 and communicates therewith via network 220.

Registry 260 is a data structure that includes information reflective of the details of the resources managed by ITSM Apps, such as ITSM Apps 232 and 236. Registry 260 can include information reflective of the dependencies between the resources managed by these ITSM Apps 232 and 236.

Message topic files 262 includes information reflective of messages published by the current "leader" ITSM App, such as a change event initiated by ITSM Apps, such as ITSM Apps 232 and 236. For example, information related to change events includes "leader" identification and usage context information, such as the identification of the resource displayed on the dashboard, such as server, network, storage, database, application server, Web server, Web application, business service, etc., the corresponding resource metrics displayed in the dashboard, such as "performance metric", "energy metric", and "SLA compliance", and the state of the resource displayed in the dashboard, such as "normal state", "warning state", or "error state".

Usage context map files 266 includes views (or graphical representations) that are suitable for displaying information about resources. For example, a single resource, such as a server, can be viewed using a 'resource detailed' view, such as "Server Detailed view", multiple resources with relationships between them can be viewed using a 'resource hierarchy' view, such as "Business Service hierarchy" view, and multiple resources in an array or vector can be viewed using a 'resource list' view, such as "Server List" view. In addition, usage context map files 266 may also describe the views that are suitable for displaying information about the resource based on the state of the resource. For example, a single resource in 'error' state, such as the server 'health' attribute is in 'error' state, can be viewed using an 'error detailed' view, such as "Server Error Detailed" view, to highlight the error details. However, when the same resource is in the 'normal' state, it can be viewed using a 'normal detailed' view, such as "Server Detailed" view.

Identity file 261 includes the identity of "leader" and "follower" ITSM Apps. Program function 256 is in communication with exemplary information store 258, in accordance with an embodiment of the present. Program function 256 is software that enables synchronization of content displayed in two or more dashboards of different ITSM Apps displayed by different devices. Program function 256 can assign the display of generated dashboards to particular displays, such as user interface 204 and 208. Program function 256 can send and receive events from computing device 202 and 206. Program function 256 can monitor ITSM events that occur on network 220. Program function 256 can determine dependencies between the resources managed by ITSM Apps, such as ITSM Apps 232 and 236. Program function 256 can receive messages published by ITSM Apps, such as ITSM Apps 232 and 236. Program function 256 can suggest views that are suitable for displaying information about resources. Program function 256 can identify "leader" and "follower" ITSM Apps. Program function 256 can transmit, via network 220, instructions to ITSM Apps, such as ITSM Apps 232 and 236.

Figure 3A:
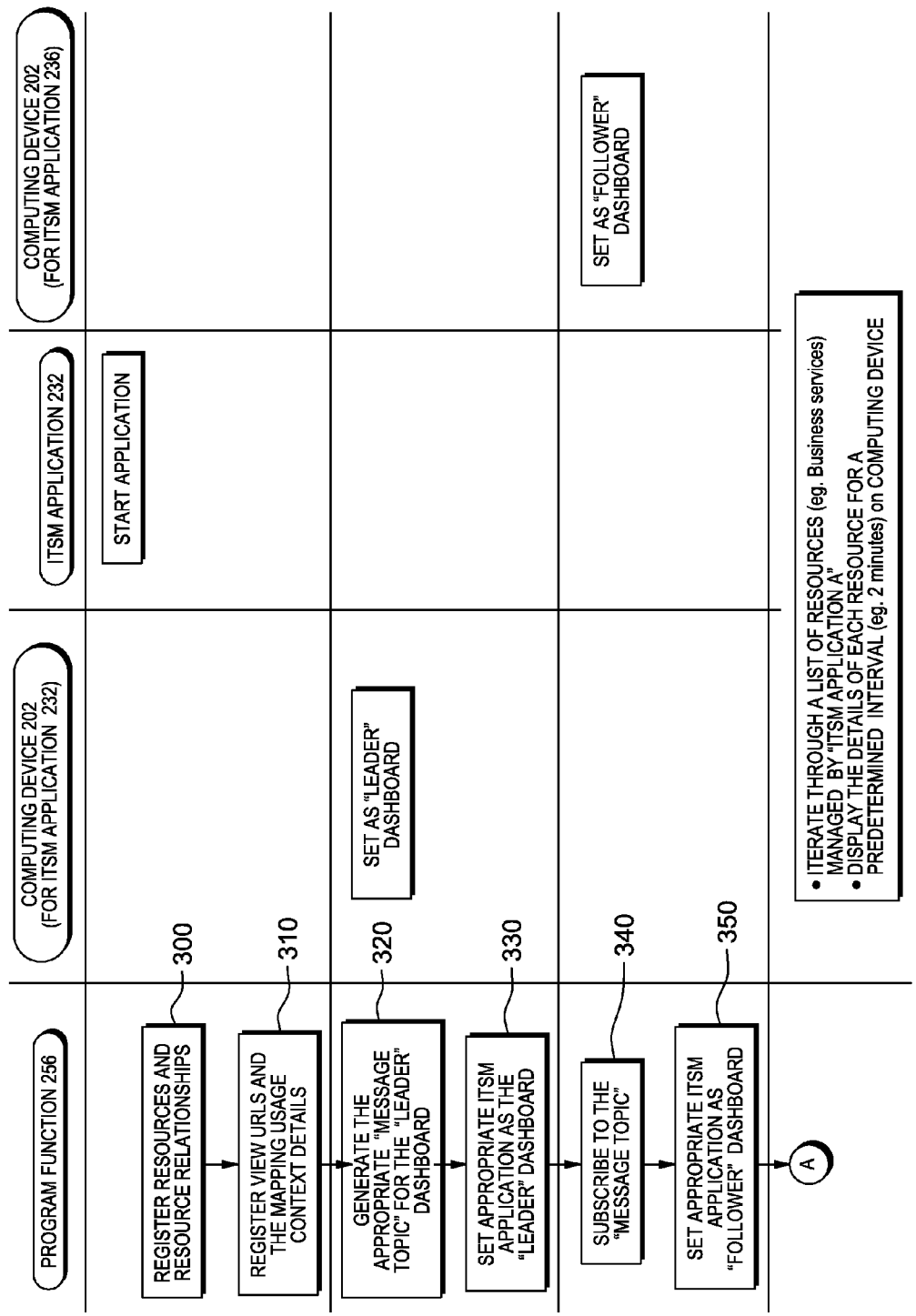
FIG. 3A is a flowchart depicting operational steps of a program function, in accordance with an embodiment of the present invention.

FIG. 3A is a flowchart depicting operational steps of program function 256, in accordance with an embodiment of the present invention. Specifically, FIG. 3A depicts the operational steps of program function 256 in synchronizing the content of distributed dashboards and the related actions that are associated with computing devices 202 and 206, in accordance with an embodiment of the present invention. Program function 256 registers resources and resource relationships (step 300). For example, program function 256 monitor ITSM App events that occur on network 220. In response to ITSM App 232 starting, program function 256 requests and receives, via network 220, details of the resources managed by the ITSM Apps of environment 200, such as ITSM Apps 232 and 236. Resource details may include an identification of one or more of an application, middleware, database, server, network element, and the relationships between two or resources. Program function 256 stores this information in registry 260.

Computing device 202, which is designated to be the dashboard container of ITSM App 232 by program function 256, displays the dashboard for ITSM App 232, for example based on the information maintained in exemplary information store 230. A user configures computing device 202 to act as the "leader" by notifying program function 256 of such. In response, program function 256 generates a new topic for computing device 202 in message topic files 262 (step 320). For example, program function 256 generates "message topic A" for the "leader". Program function 256 updates the identity files with the identity of the "leader" dashboard (step 330). For example, program function 256 updates identity file 261 with the identification of computing device 202 as the "leader".

User interface 208 displays the dashboard for ITSM App 236 based on the information maintained in exemplary information store 234. The user configures computing device 206 to act as a "follower" of the "leader", by notifying program function 256. Program function 256 subscribes to the topic (step 340). For example, program function 256 subscribed to the appropriate topic included in message topic files 262. Program function 256 sets the appropriate ITSM App as the "follower" dashboard (step 350). For example, program function 256 updates identity file 261 with the identification of computing device 206 as "the follower".

ITSM App 232, which generates the "leader" dashboard, is preconfigured to iterate through a list of resources, such as Business services BS1, BS2, BS3, etc., and display the details of each resource in user interface 204 for a predetermined time period, such as every 2 minutes. For example, program function 256 may transmit a timer-based periodic event to the appropriate ITSM App that generates the desired dashboard.

Figure 3B:
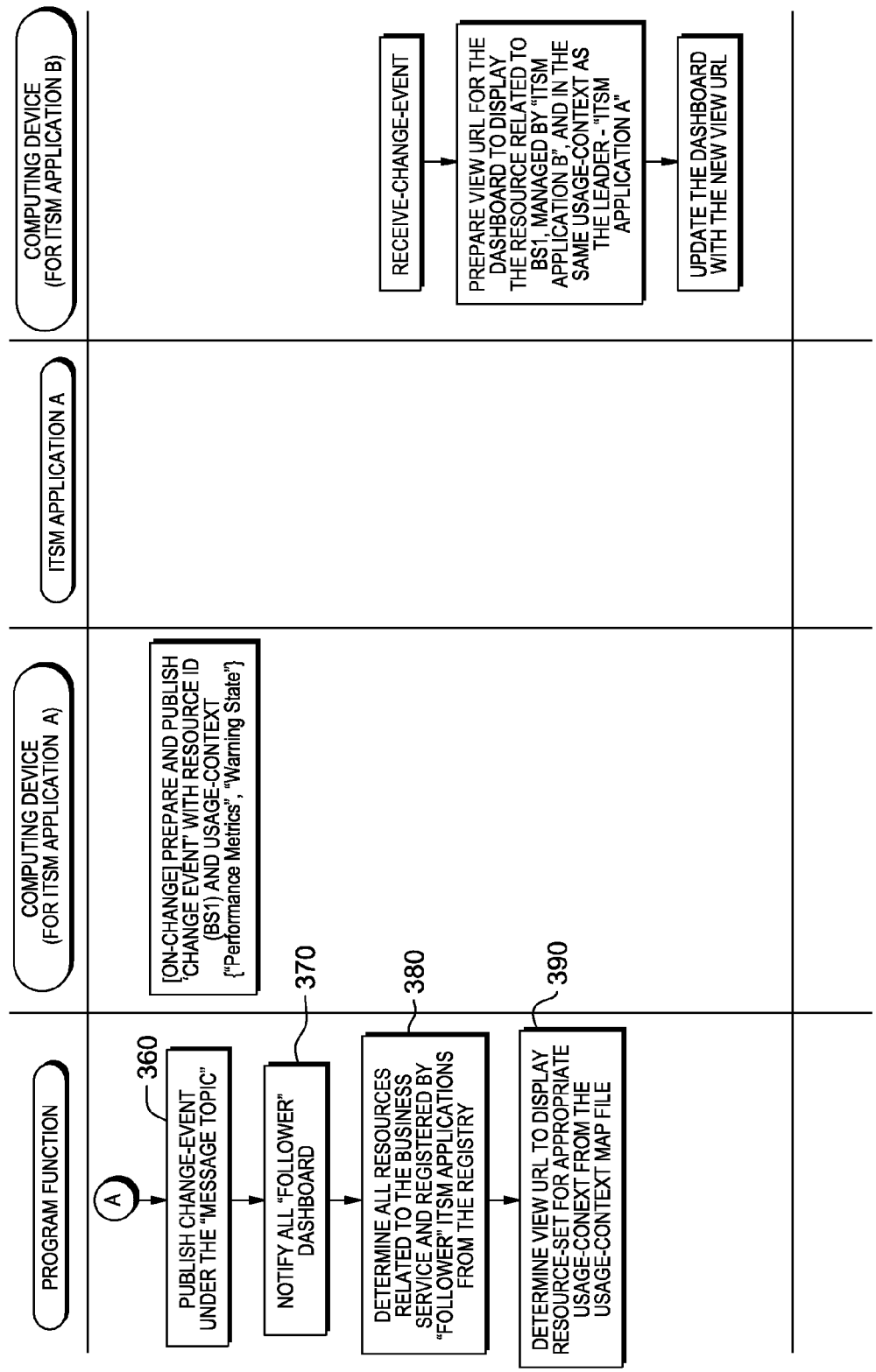
FIG. 3B is a flowchart depicting additional operational steps of the program function, in accordance with an embodiment of the present invention.

FIG. 3B depicts additional operational steps of program function 256, in accordance with an embodiment of the present invention. Specifically, FIG. 3B depicts additional operational steps of program function 256 that continue from step 350 of FIG. 3A. Computing device 202 monitors the details of resources displayed in user interface 204. As and when new resource information is displayed in the dashboard that is displayed by user interface 204, program function 256 requests a new change event from computing device 202. The change event will comprise the details resources displayed (e.g. business service "BS1"), the type of metrics displayed (e.g. "performance metrics"), and the state and/or health of the resources (e.g. "Warning").

Program function 256 publishes received change events under the appropriate message topic (step 360). Program function 256 publishes the change event received from computing device 202 under the message topic created for computing device 202. Program function 256 notifies all "follower" dashboards of the new topic (step 370). All the subscribers to this topic, such as computing device 206, are notified of the new topic.

Program function 256 determines the resources that are associated with the desired service (step 380). For example, program function 256 determines the identity and/or location of resources that are associated with the desired service. The "follower" dashboard receives the change event. Program function 256 determines the related resources included in registry 260 that can be displayed by the corresponding ITSM App 236. For example, ITSM App 236 can display details about the computer system and/or server used to run business service BS1, which is displayed by ITSM App 232 in user interface 204. Since registry 260 include details about resource dependencies, such as the dependency between business service BS1 and servers S1, S2, S4, and S8, program function 256 returns a list that includes the computer system and/or server S1, S2, S4, and S8.

Program function 256 determines the appropriate view universal resource locator (URL) (step 390). For example, the change event from computing device 202 will also contain the usage context of the dashboard displayed in user interface 204. The usage context is comprised of the nature of metrics displayed, such as "performance metrics" of BS1, and the health of the resource, such as BS1 is in "warning" state. Program function 256 uses this information to query usage context map file 266 and determine an appropriate URL template for the view that can be used to display a "List" of servers, such as S1, S2, S4, and S8, while highlighting the "performance" metrics of these servers and the "error/warning" state of the servers that potentially contribute to the warning state of BS1. Program function 256 instructs computing device 206, or dashboard container for user interface 208, to formulate a complete URL for the view that can be used to display the server data, such as S1, S2, S4, and S8, from exemplary information store 234 using the ITSM App 236. Similarly, program function 256 instructs the "follower" to display the details of the related resource data in user interface 212 for business service BS1 that is displayed in user interface 204.

Figure 4:
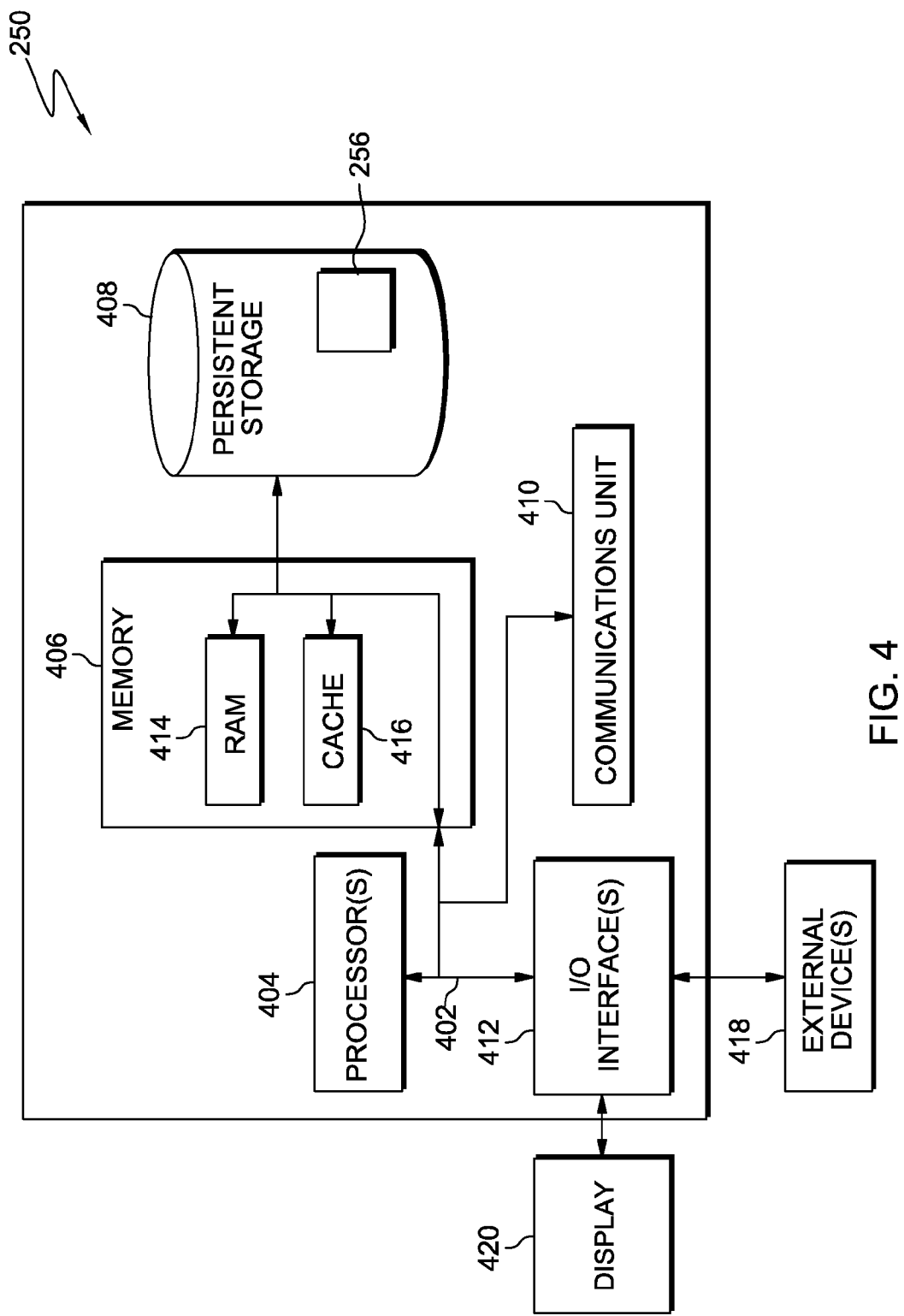
FIG. 4 depicts a block diagram of components of the server of FIG. 1, in accordance with an embodiment of the present invention.

FIG. 4 depicts a block diagram of components of server 250 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 250 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Program function 256 and exemplary information store 258 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of exemplary information stores 230 and 234 as well as computing devices 202 and 206. In these examples, communications unit 410 includes one or more network interface cards. Communications unit 410 may provide communications through the use of either or both physical and wireless communications links. Program function 256 may be downloaded to persistent storage 408 through communications unit 410.

I/O interface(s) 412 allows for input and output of data with other devices that may be connected to server 250. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., program function 256, can be stored on such portable computer readable storage media and can be loaded onto persistent storage 408 via I/O interface(s) 412. I/O interface(s) 412 also connects to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience; and thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or combinations of special purpose hardware and computer instructions. Any combination of one or more computer readable non-transitory medium(s) may be utilized. The computer readable medium may be a computer readable signal medium or a computer readable storage medium.

The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

What is claimed is:

1. A method to synchronize distributed dashboards, the method comprising:

designating, by one or more processors, a first application of a plurality of applications as a leader application, wherein the remaining applications of the plurality of applications are designated as follower applications;

publishing, by one or more computer processors, a resource detail and an associated first usage context, wherein the resource detail is displayed by a dashboard associated with the leader application;

determining, by one or more computer processors, an appropriate graphical representation for the follower application, to display a first resource having a relationship to a second resource, wherein the second resource is displayed in the dashboard associated with the leader application;

generating, by one or more computer processors, a dashboard universal resource locator for the follower application utilizing the resource detail; and instructing, by one or more computer processors, the follower application to update an associated dashboard with information included in the generated dashboard universal resource locator, wherein the dashboard associated with the leader application is synchronized with a dashboard of one or more follower applications.

2. The method of claim 1, wherein the resource detail include an identification of one or more of an application, middleware, database, server, network element, and relationship between two or more resources.

3. The method of claim 1, further comprising instructing the leader application to iterate through a list of two or more resources at a predetermined periodicity.

4. The method of claim 1, wherein the one or more processors are included in a distributed computing environment.

5. The method of claim 1, wherein the step of determining, by the one or more computer processors, the appropriate graphical representation for the follower application, includes determining, by the one or more computer processors, a resource that is related to and managed by the follower application in a second usage context, wherein the second usage context is similar to the first usage context.

6. A computer program product comprising:

one or more computer readable tangible storage media and program instructions stored on the one or more computer readable tangible storage media, the program instructions executable by one or more processors to:

designate a first application of a plurality of applications as a leader application, wherein the remaining applications of the plurality of applications are designated as follower applications;

publish a resource detail and an associated first usage context, wherein the resource detail is displayed by a dashboard associated with the leader application;

determine an appropriate graphical representation for the follower application, to display a first resource having a relationship to a second resource, wherein the second resource is displayed in the dashboard associated with the leader application;

generate a dashboard universal resource locator for the follower application utilizing the resource detail; and instruct the follower application to update an associated dashboard with the generated dashboard universal resource locator, wherein the dashboard associated with the leader application is synchronized with a dashboard of one or more follower applications.

7. The computer program product of claim 6, wherein the resource detail include an identification of one or more of an application, middleware, database, server, network element, and relationship between two or more resources.

8. The computer program product of claim 6, further comprising program instructions to instruct the leader application to iterate through a list of two or more resources at a predetermined periodicity.

9. The computer program product of claim 6, wherein the one or more processors are included in a distributed computing environment.

10. The computer program product of claim 6, wherein the program instructions to determine the appropriate graphical representation for the follower application, includes program instructions to determine a resource that is related to and managed by the follower application in a second usage context, wherein the second usage context is similar to the first usage context.

11. A computer system comprising:

one or more computer processors;

one or more computer readable tangible storage media;

program instructions stored on the one or more computer readable tangible storage media for execution by at least one of the one or more computer processors, the program instructions comprising program instructions to:

designate a first application of a plurality of applications as a leader application, wherein the remaining applications of the plurality of applications are designated as follower applications;

publish a resource detail and an associated first usage context, wherein the resource detail is displayed by a dashboard associated with the leader application;

determine an appropriate graphical representation for the follower application, to display a first resource having a relationship to a second resource, wherein the second resource is displayed in a dashboard associated with the leader application;

generate a dashboard universal resource locator for the follower application utilizing the resource detail; and instruct the follower application to update an associated dashboard with the generated dashboard universal resource locator, wherein the dashboard associated with the leader application is synchronized with a dashboard of one or more follower applications.

12. The computer system of claim 11, wherein the resource detail include an identification of one or more of an application, middleware, database, server, network element, and relationship between two or more resources.

13. The computer system of claim 11, further comprising program instructions to instruct the leader application to iterate through a list of two or more resources at a predetermined periodicity.

14. The computer system of claim 11, wherein the one or more processors are included in a distributed computing environment.

15. The computer system of claim 11, wherein the program instructions to determine the appropriate graphical representation for the follower application, includes program instructions to determine a resource that is related to and managed by the follower application in a second usage-context, wherein the second usage context is similar to the first usage context.

* * * * *